(12) United States Patent
McKenzie et al.

(10) Patent No.: US 6,169,382 B1
(45) Date of Patent: Jan. 2, 2001

(54) ADAPTING SEEK VELOCITY PROFILE TO DESTINATION TRACK LOCATION

(75) Inventors: Lealon R. McKenzie, Edmond; Roy L. Wood, Yukon, both of OK (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/301,294

(22) Filed: Apr. 28, 1999

Related U.S. Application Data (60) Provisional application No. 60/091,630, filed on Jul. 2, 1998.

(51) Int. Cl.⁷ .................................................. G05B 13/00
(52) U.S. Cl. ........................ 318/561; 318/561; 318/611; 364/151; 364/159; 360/69; 360/81
(58) Field of Search ..................... 318/561, 611; 364/151, 159; 360/78.07, 69, 81, 82

(56) References Cited

U.S. PATENT DOCUMENTS

| | | | |
|---|---|---|---|
| 4,099,112 | * 7/1978 | Klinger | 318/561 |
| 4,314,291 | 2/1982 | Oda et al. | 360/78 |
| 4,544,968 | 10/1985 | Anderson et al. | 360/78 |
| 4,636,883 | * 1/1987 | Hachimoto | 360/78 |
| 4,697,127 | 9/1987 | Stich et al. | 318/561 |
| 4,775,903 | 10/1988 | Knowles | 360/78 |
| 4,907,109 | 3/1990 | Seniö | 360/78.04 |
| 4,937,689 | 6/1990 | Seaver et al. | 360/78.07 |
| 4,967,291 | 10/1990 | Touchton et al. | 360/78.04 |
| 4,982,298 | 1/1991 | Volz et al. | 360/78.06 |
| 4,988,933 | 1/1991 | Ogawa | 318/561 |
| 5,003,415 | * 3/1991 | Freeze | 360/78.06 |
| 5,063,454 | 11/1991 | Hashimoto | 360/78.04 |
| 5,132,855 | 7/1992 | Waugh et al. | 360/78.07 |
| 5,189,571 | * 2/1993 | Murphy et al. | 360/75 |
| 5,262,907 | 11/1993 | Duffy et al. | 360/77.05 |
| 5,287,234 | 2/1994 | Suzuki | 360/78.01 |
| 5,297,024 | 3/1994 | Carobolante | 360/67 |
| 5,305,160 | * 4/1994 | Funches et al. | 360/78.07 |
| 5,475,545 | * 12/1995 | Hampshire | 360/78.06 |
| 5,657,179 | * 8/1997 | McKenzie | 360/78.06 |
| 5,668,680 | * 9/1997 | Tremaine | 360/78.07 |
| 5,691,617 | 11/1997 | Funches | 318/632 |

FOREIGN PATENT DOCUMENTS

| | | |
|---|---|---|
| 0536737A2 | 4/1993 | (EP) . |
| 04358368 | 12/1992 | (JP) . |
| WO 96/19804A | 6/1996 | (WO) . |

* cited by examiner

*Primary Examiner*—Robert E. Nappi
*Assistant Examiner*—Rita Leykin
(74) *Attorney, Agent, or Firm*—Crowe & Dunlevy (57) ABSTRACT

Apparatus and method for improved disc drive data storage capacity and seek performance. The disc drive includes a rotatable disc with a recording surface on which a plurality of tracks are defined and an actuator which supports a head adjacent the tracks. A servo circuit uses a velocity profile to position the head adjacent a destination track, with the servo circuit adaptively selecting the velocity profile in relation to the physical location of the destination track. The servo circuit preferably uses a reduced maximum velocity and a decreased deceleration rate when the deceleration track is adjacent an innermost or outermost diameter of the disc, thereby reducing the risk of damage as a result of contact between the actuator and a limit stop used to limit radial excursion of the head.

13 Claims, 7 Drawing Sheets

ADAPTING SEEK VELOCITY PROFILE TO DESTINATION TRACK LOCATION

RELATED APPLICATIONS

This application claims the benefit of United States Provisional Application No. 60/091,630 entitled IMPROVED DISC DRIVE AERIAL CAPACITY BY ADJUSTING MAXIMUM VELOCITY VERSUS DESTINATION TRACK, filed Jul. 2, 1998.

FIELD OF THE INVENTION

This invention relates generally to the field of disc drive data storage devices, and more particularly, but not by way of limitation, to an apparatus and method for improving disc drive data storage capacity and performance by adaptively adjusting the velocity profile of a head during a seek in relation to the radial location of the destination track.

BACKGROUND

A disc drive is a data storage device used to store and retrieve computerized data in a fast and efficient manner. A typical disc drive comprises one or more rigid discs that are coated with a magnetizable medium and mounted on the hub of a spindle motor for rotation at a constant high speed. The data are stored on the discs in a plurality of concentric circular tracks by an array of transducers ("heads") mounted to a radial actuator for movement of the heads relative to the discs.

The heads are mounted via flexures at the ends of a plurality of arms which project radially outward from an actuator body. The actuator body pivots about a shaft mounted to the disc drive housing at a position closely adjacent the outer diameter of the discs. The pivot shaft is parallel with the axis of rotation of the spindle motor and the discs so that the heads move in a plane parallel with the surfaces of the discs.

Typically, the actuator employs a voice coil motor to position the heads with respect to the disc surfaces. The actuator voice coil motor includes a coil mounted on the side of the actuator body opposite the head arms so as to be immersed in the magnetic field of a magnetic circuit with one or more permanent magnets. When controlled current is passed through the coil, an electromagnetic field is set up which interacts with the magnetic field of the permanent magnets to cause the heads to move across the disc surfaces.

The heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a read signal which is decoded by read channel circuitry of the disc drive.

Control of the position of the heads is typically achieved with a closed loop, digital servo system such as disclosed in U.S. Pat. No. 5,262,907 issued Nov. 16, 1993 to Duffy et al., assigned to the assignee of the present invention and incorporated herein by reference. In such a system, servo (positional control) data are interspersed with user data fields used to store the user data, with the servo data being transduced by the heads and provided to the servo system to detect head position and velocity.

The servo system carries out two primary operations: seeking and track following. During track following, the selected head is maintained over a selected track on the corresponding disc. To this end, the servo system uses the servo data to generate a position error signal (PES) indicative of the relative distance between the head and the center of the selected track. In turn, the PES is used to generate correction signals which adjust the position of the head by adjusting the amount of current applied to the actuator coil.

During a seek operation, the selected head is moved from an initial track to a destination track on the associated disc surface. A velocity controlled approach is used wherein a velocity profile, indicative of a desired velocity trajectory for the head, is selected based on the distance between the initial and destination tracks. The head is first accelerated to a maximum velocity through the application of a large magnitude of current to the coil. The head then is maintained at this maximum velocity until it reaches a predetermined distance from the destination track, at which point a large amount of current of opposite polarity is applied to the coil to decelerate and settle the head onto the destination track. Adjustments in the velocity of the head are repetitively made during the seek in relation to the difference between the actual velocity and the velocity profile. The desired velocity at any given point during the seek is referred to as a demand velocity, with the velocity profile comprising a series of demand velocity values. If a fault occurs during the seek, the coil will be shorted, causing the actuator to brake.

To maximize data transfer performance, attempts are made to minimize the time required to perform each seek, as the disc drive can only transfer data during a track following mode of operation. Hence, disc drive designers attempt to provide a maximum velocity that is as high as practicable to allow the head to reach the destination track in a short amount of time.

There is an attendant danger of damage to the drive, however, should the servo system lose control of the actuator during a seek; such a loss of control can occur, for example, from a loss of power to the drive. Limit stops (sometimes referred to as "crash stops") are provided to limit the maximum radial extension of the heads as they sweep across the disc surfaces. Such limit stops are typically arranged to contact a corresponding features of the actuator when the heads are at the innermost and outermost diameters of the discs. If the servo system fails to adequately reduce the velocity of the heads, the abrupt deceleration of the actuator upon contact with the associated limit stop can cause excessive movement of the heads, potentially damaging the heads and/or the disc surfaces.

One prior art approach to reducing damage to the disc drive from an over-velocity condition is disclosed by U.S. Pat. No. 4,967,291 issued Oct. 30, 1990 by Touchton et al. ("Touchton '291"), which limits the maximum velocity of the heads during a seek to a sufficient level so that, should a run-away condition occur, the heads are not damaged upon contact with the associated limit stop. Touchton '291 monitors the velocity of the head and interrupts the application of current to the actuator coil (such as by temporarily shorting the coil) when the velocity exceeds a safe threshold.

Another prior art approach is to make the limit stops sufficiently soft so as to safely decelerate the heads upon contact at full speed. A problem with this approach is that a relatively large deceleration zone is required proximate the stops to accommodate the deceleration of the actuator into the stops. Because the actuator is in contact with the limit stops while the heads are over the deceleration zones, the zones cannot be used to store data. Thus, a large deceleration zone requires a narrowing of the data recording band and limits the total data capacity of the drive.

While operable, there remains a continued need for improvements in the art to enable disc drive designers to achieve ever increasing data densities and levels of data transfer performance. It is to these ends that the present invention is directed.

SUMMARY OF THE INVENTION

The present invention is directed to an apparatus and method for improving the operational performance of a disc drive using an adaptive velocity profile selected in relation to destination track location.

In accordance with preferred embodiments, a disc drive includes a rotatable disc with a recording surface on which a plurality of tracks are defined and an actuator which supports a head adjacent the tracks. The head is moved through application of current to a coil of an actuator motor, with limit stops being provided to limit the maximum radial excursion of the head. A servo circuit performs a velocity-controlled seek operation to move the head from an initial track to a destination track by accelerating and maintaining the head at a maximum velocity and then decelerating the head to the destination track in accordance with a velocity profile.

Preferably, the servo circuit adapts the deceleration portion of the velocity profile in relation to the physical location of the destination track on the disc, so that the head is decelerated at a reduced rate for tracks adjacent innermost and outermost diameters of the disc as compared to tracks near intermediate portions of the disc. This serves to minimize damage to the disc drive should control of the actuator be lost and the actuator come into contact with a limit stop.

Additionally, the servo circuit preferably selects a variable maximum velocity in relation to the physical location of the destination track, so that a reduced maximum velocity is selected for tracks adjacent the innermost and outermost diameters of the disc and a greater maximum velocity is selected for intermediate tracks.

These and various other features as well as advantages which characterize the present invention will be apparent from a reading of the following detailed description and a review of the associated drawings.

BRIEF DESCRIPTION OF THE DRAWINGS

FIG. 7 provides a control diagram illustrating the operation of the servo circuit of FIG. 2 during a velocity controlled seek, and is representative of programming utilized by the servo circuit digital signal processor (DSP) in accordance with preferred embodiments.

DETAILED DESCRIPTION

Figure 1:
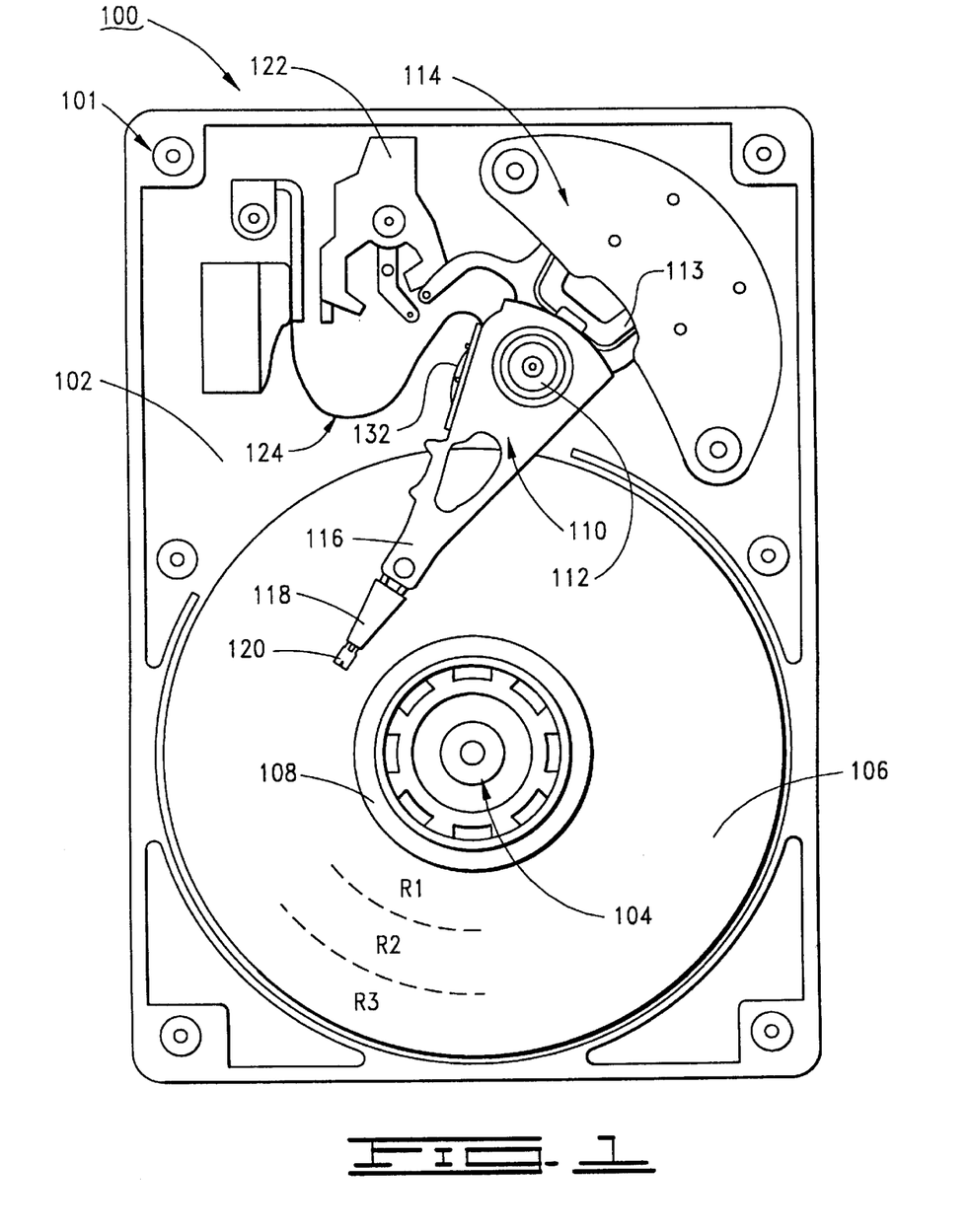
FIG. 1 provides a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) supporting control electronics used by the disc drive 100. The PWA is mounted to the underside of the HDA 101 and hence, is not visible in FIG. 1.

The HDA 101 includes a base deck 102 which supports a spindle motor 104 used to rotate a plurality of discs 106 at a constant high speed. Although not shown, it will be understood that tracks are defined on each of the disc surfaces using servo data written to the disc drive 100 during manufacturing in a conventional manner. A disc clamp 108 secures the discs 106 and a series of disc spacers disposed between adjacent discs (not visible in FIG. 1) to the spindle motor 104. A top cover (not shown) mates with the base deck 102 to provide an internal environment for the HDA 101.

A rotary actuator 110 is configured for rotation about a cartridge bearing assembly 112 supported by the base deck 102. The actuator 110 is rotated through controlled application of current to an actuator coil 113 of a voice coil motor (VCM) 114. A plurality of actuator arms 116 project from the actuator 110 and support flexure assemblies 118 which, in turn, support a plurality of corresponding heads 120 over the surfaces of the discs 106. A latch/stop assembly 122 secures the heads over texturized landing zones (not designated) at the inner diameters of the discs 106 when the disc drive is not in use and includes limit stops (not separately designated) to limit the radial extent (stroke) of the actuator 110. A flex circuit assembly facilitates electrical communication between the actuator 110 and the disc drive PWA.

At this point, it will be noted that three radially extending regions are set forth on the top disc 106, with these regions denoted as R1, R2 and R3, respectively. As discussed below, the maximum velocity that each selected head 120 achieves during a seek is preferably determined in relation to the region in which the destination track resides. Moreover, the deceleration profile of the head 120 is further preferably selected in relation to the associated region for the destination track.

Figure 2:
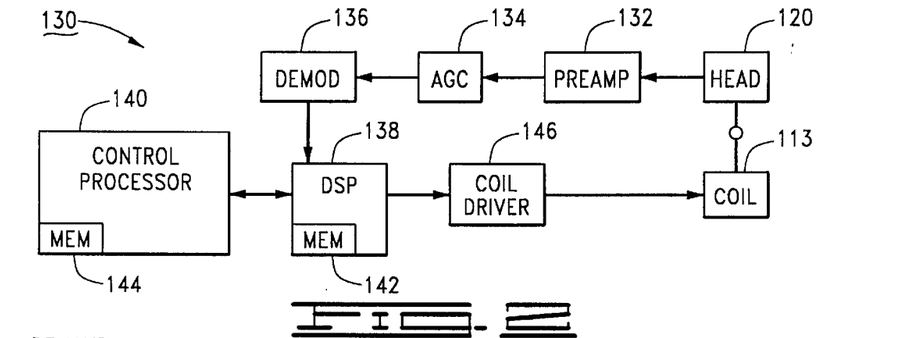
FIG. 2 provides a functional block diagram of a servo circuit used to control the position of the heads of the disc drive of FIG. 1.

Turning now to FIG. 2, shown therein is a functional block diagram for a servo circuit 130 used to control the position of the heads 120. Servo data are transduced by a selected head 120 to generate a readback signal which is amplified by a preamplifier (preamp) 132. The preamp 132 is preferably incorporated in the flex circuit 124 and mounted to the side of the actuator 110 (see FIG. 1), in order to minimize the physical distance between the preamp 132 and the head 120. The amplified readback signal next undergoes an amplitude normalization function by an automatic gain control (AGC) circuit 134, which adjusts the amplitude range of the readback signal to a range suitable for remaining portions of the servo circuit 130.

The readback signal is next provided to a demodulator circuit (demod) 136, which decodes and conditions the servo data to provide digital inputs to a digital signal processor (DSP) 138. The DSP 138 receives top level instructions from a disc drive control processor 140 and performs seeks and track following operations using programming stored in DSP memory (MEM) 142. The disc drive control processor 140 uses top level programming in processor memory (MEM) 144 to control the overall operation of the disc drive 100, including the transfer of data between the heads 120 and a host computer (not shown) in which the disc drive 100 is mounted.

The DSP 138 outputs a series of current command signals to a coil driver circuit 146, which applies current to the coil 113, thereby adjusting the radial position of the selected head 120. The basic operation of the servo circuit 130 during a velocity controlled seek will now be discussed with reference to FIGS. 3 and 4.

Figure 3:
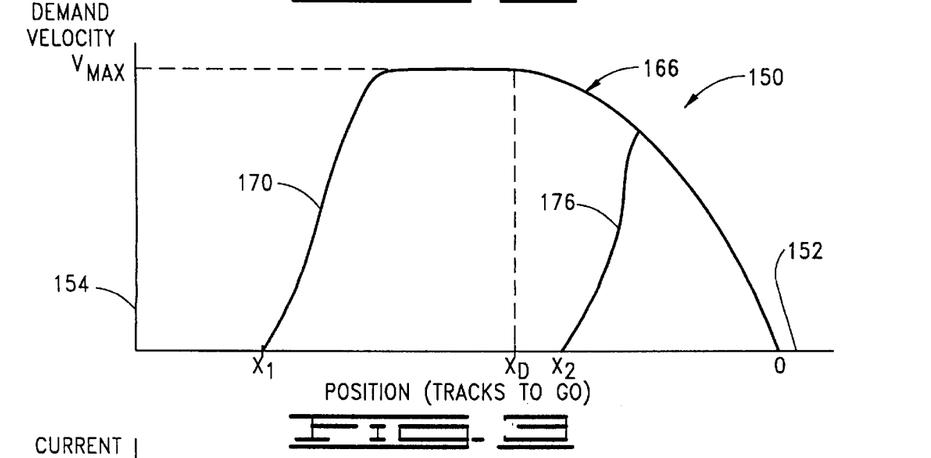
FIG. 3 illustrates a velocity profile for the disc drive, indicative of a series of demand velocities which make up a desired trajectory of the selected head as the head approaches a destination track.

FIG. 3 shows a family of velocity profiles (generally denoted at 150), plotted against an x-axis 152 and a y-axis 154. The x-axis 152 indicates position with respect to the disc 106, in terms of the number of "tracks to go" until a destination track "0" is reached. It will be readily understood that each track has a unique numeric track address which is stored as part of the servo data discussed above. However, the designation of the destination track as "track 0" is not the same thing as, or indicative of the actual address of the track; rather, each track is conveniently referred to as "track 0" at such time that it is identified as the destination track during a particular seek.

Figure 4:
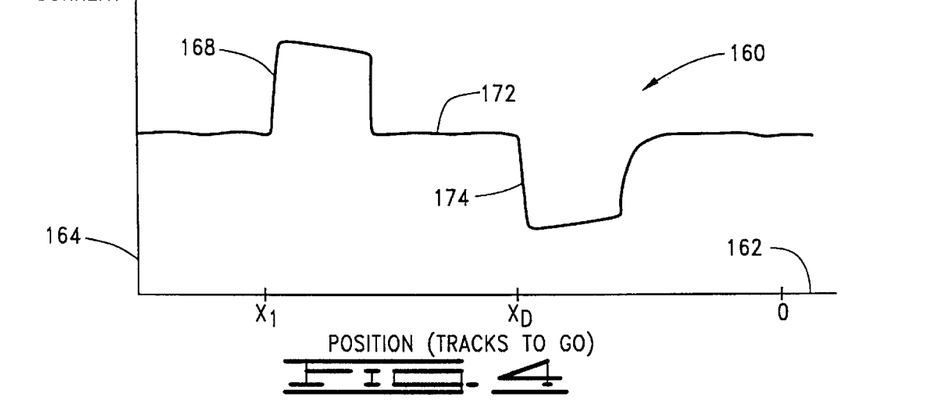
FIG. 4 illustrates a corresponding current profile indicative of current applied to the actuator coil to cause the head to follow the velocity profile of FIG. 3.

Continuing with FIG. 3, the y-axis 154 indicates demand velocity, that is, the target, or desired, velocity for the head 120 at various points during the seek. FIG. 4 provides a corresponding current profile 160 indicative of current applied to the coil 113 and plotted against an x-axis 162 indicative of tracks to go during the seek and a y-axis indicative of current magnitude.

It can be seen from FIG. 3 that the velocity profiles 150 share a common deceleration portion 166, which begins with a demand velocity of $V_{MAX}$ at track $X_D$ and decreases to a demand velocity of 0 at track 0. The track $X_D$ is a predetermined number of tracks from track 0. Seeks that begin from initial tracks that are farther from the destination track 0 than track $X_D$, such as the seek represented in FIG. 3 as beginning at track $X_1$, are initially accelerated toward the destination track 0 as a result of the application of a large amount of current to the coil 113 by the coil driver 146. This current is represented by current pulse 168, which results in acceleration of the head along trajectory portion 170.

Once the maximum demand velocity $V_{MAX}$ is reached, the head 120 coasts until track $X_D$ is reached; during this time, only small adjustments in current are necessary, as indicated by current portion 172. As the head 120 reaches track $X_D$, a current pulse 174, having a polarity opposite the initial pulse 172, is applied by the coil driver 146 to decelerate the head 120 along the deceleration portion 166 until the head 120 is settled onto the destination track 0.

A similar process is used for velocity controlled seeks from tracks closer to the destination track 0 than the track $X_D$, such as from track $X_2$; in this case, current is again applied to the coil 113 to accelerate the head (as indicated by acceleration portion 176) until the deceleration portion 166 is reached, after which current of opposite polarity is applied to bring the head 120 to rest over the destination track 0. Unlike the previous seek, however, the head does not reach and coast at a maximum velocity before the deceleration phase is initiated.

For reference, it will be noted that the above described velocity controlled seek process is carried out for seeks having a relatively long duration (referred to as "long seeks"). Below a certain length (such as 100 tracks), a position controlled approach is used where adjustments in head position are fed forward to incrementally move the head 120 to the destination track 0.

In the prior art, the maximum demand velocity $V_{MAX}$ is generally the same, regardless of the physical address of the destination track 0. The selected value of $V_{MAX}$ depends on a number of factors, including the maximum amount of current available from the coil driver 146, but generally involves a tradeoff between reducing the amount of time required to carry out the average seek, which argues in favor of a higher $V_{MAX}$, and reducing the risk of damage to the drive as a result of a power loss or other fault condition, which argues in favor of a lower $V_{MAX}$. Such limitations are overcome by the present invention, a first preferred embodiment of which will now be discussed with reference to FIG. 5.

Figure 5:
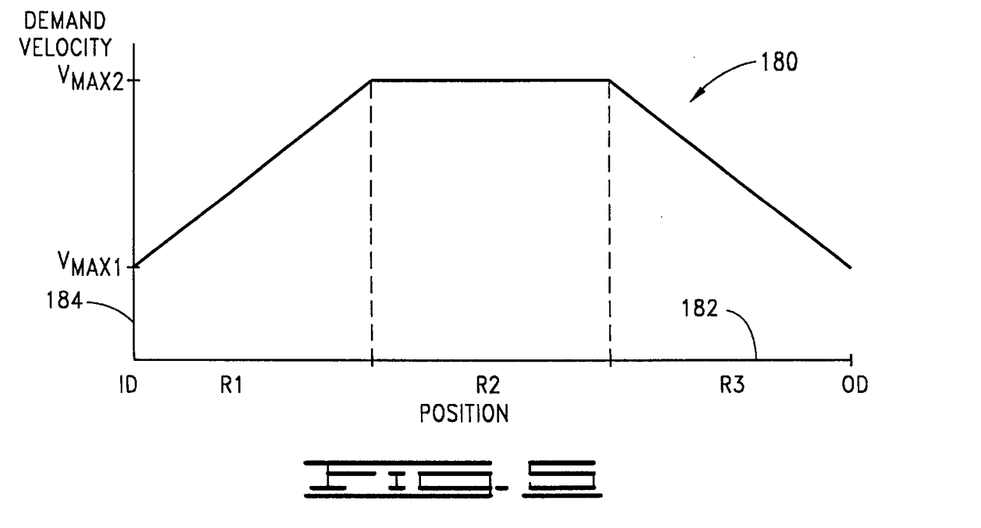
FIG. 5 is a two-dimensional graphical representation of maximum demand velocities for the tracks on the discs of the disc drive of FIG. 1.

FIG. 5 shows a graphical representation of a maximum demand velocity curve 180, plotted against an x-axis 182 indicative of radial position across the disc 106 and a y-axis 184 indicative of demand velocity magnitude. It will be noted that the regions R1, R2 and R3 along the x-axis 182 in FIG. 5 correspond to those previously set forth on the top disc 106 in FIG. 1. Although the regions R1, R2 and R3 are shown to substantially divide the surface of the disc 106 into thirds, such is merely in accordance with a preferred embodiment; other configurations, including numbers and lengths of regions are readily contemplated.

From FIG. 5 it can be seen that, in this embodiment, the maximum demand velocity is set to a first value $V_{MAX1}$ at the innermost track at the inner diameter (ID) in region R1 and increases to a second value $V_{MAX2}$ at the boundary between regions R1 and R2. The maximum demand velocity remains the second value $V_{MAX2}$ across the radial extent of the region R2, and decreases from $V_{MAX2}$ to $V_{MAX1}$ across region R3. Although a generally linear relationship is shown between $V_{MAX1}$, and $V_{MAX2}$, other configurations are readily contemplated, such as use of a higher order function (such as a quadratic function) to determine intermediate values of maximum demand velocity.

This configuration results in an adaptive maximum demand velocity depending upon the location (physical address) of the destination track. For seeks that conclude at destination tracks in region R2 (i.e., the "middle," or "intermediate portions" of the disc 106), the larger $V_{MAX2}$ is used; conversely, the maximum demand velocity decreases as the destination track becomes closer to the inner or outer diameters of the disc 106.

In this way, seeks carried out to destination tracks adjacent the edges of the disc recording surface can be safely carried out at a reduced maximum velocity, reducing the likelihood of damage to the disc drive 100 should a fault in control of the actuator 110 occur and the actuator's "fault induced braking" does not have time to sufficiently slow the arm before contact with the associated limit stop. Moreover, seeks to destination tracks that are farther from the limit stops can be safely carried out at a higher maximum velocity, as there will be more time to brake the actuator 110 before contact is made with the limit stop should a fault occur.

Although the particular values for $V_{MAX1}$ and $V_{MAX2}$ will be selected based on the requirements of a given application, such can be preferably selected to achieve substantially the same average seek time as a drive using uniform maximum demand velocity. For example, using a $V_{MAX1}$ of about 130 centimeters (cm)/second (50 inches/sec) and a $V_{MAX2}$ of about 380 cm/sec (150 inches/sec) can achieve substantially the same average seek time as a drive using a uniform $V_{MAX}$ of about 250 cm/sec (100 inches/sec). Generally, optimal average access time can be achieved when one third stroke just reaches maximum velocity.

Figure 6:
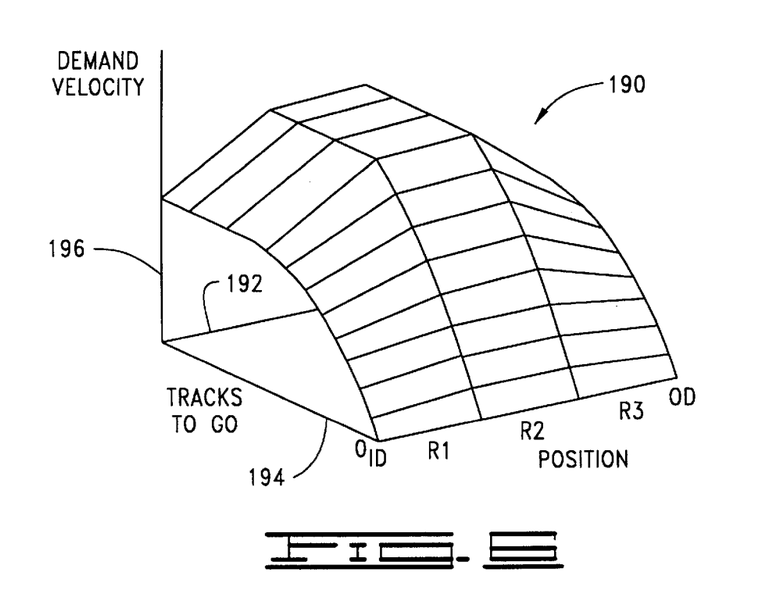
FIG. 6 is a three-dimensional graphical representation of a family of velocity profiles for the tracks on the discs in accordance with preferred embodiments.

As discussed above, $V_{MAX}$ represents the maximum velocity of the head 120 during the seek, after which the head is decelerated along a deceleration profile (such as the deceleration profile 166 of FIG. 3). Accordingly, the velocity profile for each head 120 will define a surface, such as represented at 190 in FIG. 6. The velocity profile surface 190 is plotted against an x-axis 192 indicative of radial position of the destination track, a y-axis 194 indicative of tracks to go to the destination track, and a z-axis 196 indicative of maximum demand velocity. It will be noted that the point at which the deceleration portion of each individual profile begins (such as the track $X_D$ in FIG. 3) can be made to vary with destination track location, as desired; that is, not only can velocity profiles to tracks in the region R1 have a lower maximum demand velocity than velocity profiles for tracks in the region R2, but the velocity profiles for the tracks in the region R1 can also start decelerating the head 120 at a point that is farther from the destination track than for the tracks in the region R2, and can accordingly be decelerated at a reduced rate. These and other considerations will be discussed more fully below.

Figure 8:
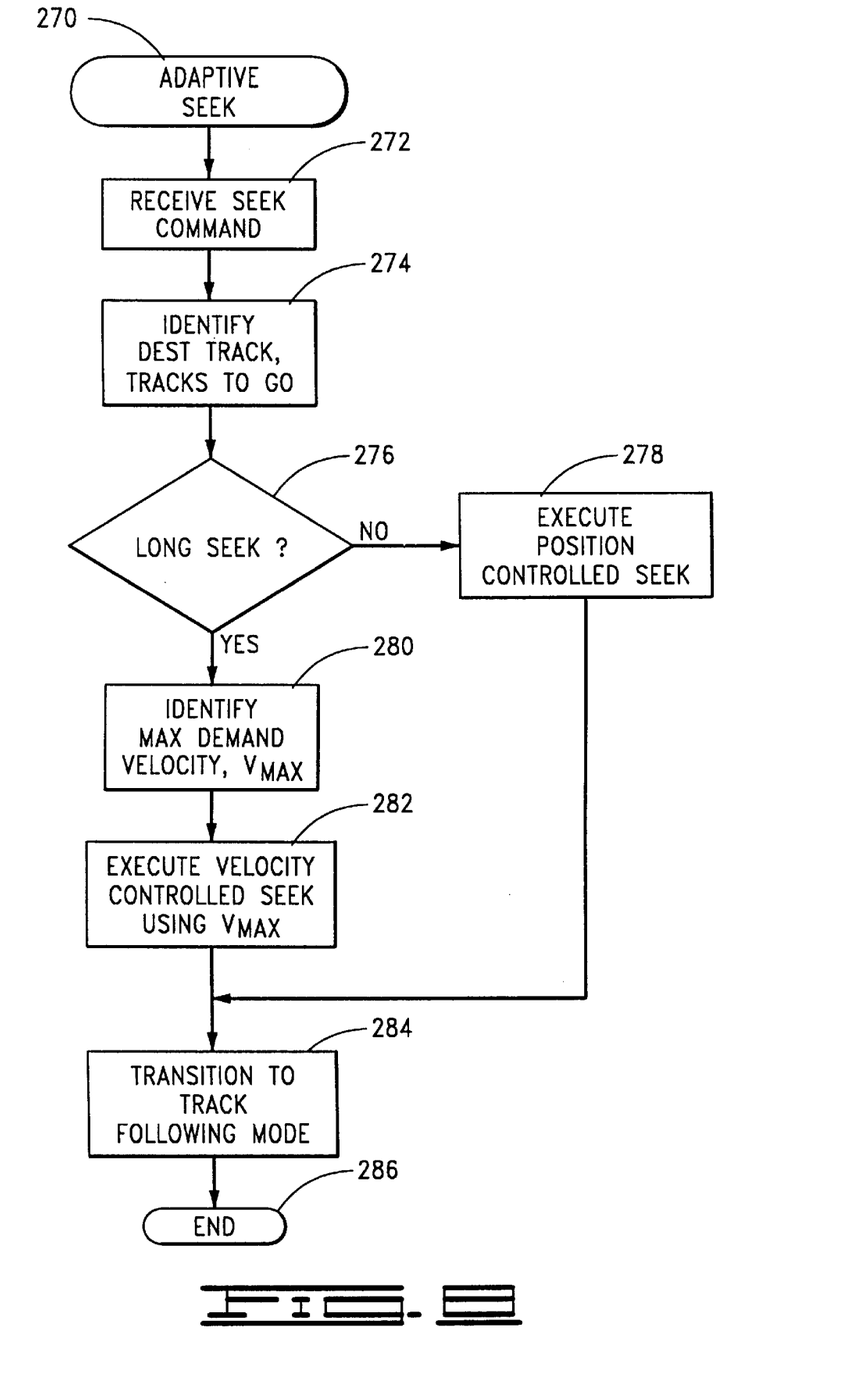
FIG. 8 provides a flow chart for an ADAPTIVE SEEK routine, representative of programming utilized by the servo circuit DSP to carry out a seek in accordance with preferred embodiments.

FIGS. 7 and 8 have been provided to better illustrate the manner in which the servo circuit 130 preferably utilizes adaptive velocity profiling during seeks. Beginning with FIG. 7, shown therein is a control diagram representative of programming stored in DSP memory 142 (FIG. 2) and utilized by the DSP 138 (FIG. 2) during a long seek.

Initially, FIG. 7 shows a plant block 200, representative of electrical and mechanical portions of the disc drive 100 including the coil driver 146, the coil 113, the head 120 and the preamp 132. An observer 202, configured to provide a mathematical model of the operation of the plant 200, outputs estimates of head position, velocity and bias ($X_E$, $V_E$ and $W_E$) on respective paths 204, 206 and 208. Bias is representative of forces that tend to move the head 120 off-track, such as windage effects from the air currents established by the rotation of the discs 106 and spring forces from the flex circuit 124. Bias will often be position dependent.

During a seek, the number of tracks to go is input on path 210 to a profiler 212. As discussed above, the tracks to go is the physical distance remaining in the seek and is determined in relation to the difference between the position of the head 120 and the location of the destination track. In response, the profiler outputs the appropriate demand velocity on path 214 through, for example, interpolation techniques or from values stored in a look-up table. The difference between the demand velocity and the estimated velocity $V_E$ is determined using summing junction 216. This difference, velocity error, is provided to gain block 218 having gain $K_{AL}$ to carry out an acceleration limiting function. The output passes through a notch filter 220 and is summed at summing junction 222 with an alternating current (AC) signal on path 224 indicative of current applied to the coil 113. At the same time, the destination track location is provided on input path 226 to a bias prediction block 228, which predicts an amount of bias which is summed with the estimated bias at summing junction 230. The output on path 232 is summed at the summing junction 222, as well as a second summing junction 234, to be discussed shortly.

The output of the summing junction 222 is provided to a gain block 236 having gain $K_T$, used to compensate for nonlinear torque characteristics of the VCM 114. The output is summed at summing junction 238 with a current null signal on path 240, used to null out current. The resulting signal on path 242 comprises a current demand signal which is provided to the plant to adjust the position of the selected head 120.

In response, the plant provides a sense output on path 244; servo data are provided to a demodulation (demod) block 246 and current level is provided to summing junction 248. After demodulation, the servo data are linearized using linearization block 250 to give a position sample $X_{SAMP}$ on path 252, which is differenced at summing junction 254 with the position estimate $X_E$ to provide an observer error $O_{ERR}$ on path 256. In this manner, the operation of the observer 202 is maintained nominally that of the plant 200.

The current input to the summing junction 248 is used for saturation compensation and is accordingly summed with a saturation null input from path 258. Gain block 260 applies a saturation gain $K_{SAT}$ and the output is differenced with the bias sum from path 232. Finite response filter (FIR) block 262 provides the desired time delay to the output of the notch filter 220, so that the observer 202 receives a switched input from either the FIR 262 or the saturation loop, depending upon whether the coil is in saturation.

Accordingly, the circuit of FIG. 7 operates to control the velocity of the head 120 during a long seek, outputting the series of demand velocity values on path 214 in relation to the length of the seek and the physical location of the destination track. FIG. 8 provides a flow chart for an ADAPTIVE SEEK routine 270, illustrating overall functionality of the servo circuit 130 in carrying out seeks in accordance with preferred embodiments.

Upon receipt of a seek command by the DSP 138 from the control processor 140, step 272, the circuit proceeds to identify both the address of the destination track and the number of tracks to go to the destination track, step 274.

From this information, the circuit next determines whether a long seek will be required, decision step 276; if not, a conventional position controlled seek is executed as indicated by step 278. Alternatively, when the destination track is sufficiently distant from the present track to warrant a long seek, the appropriate velocity profile, including the maximum demand velocity $V_{MAX}$, is loaded (or calculated), step 280 and utilized during the seek, step 282. At the conclusion of either type of seek, the servo circuit 138 transitions to a track following mode onto the destination track at step 284 and the routine ends at 286.

Figure 9:
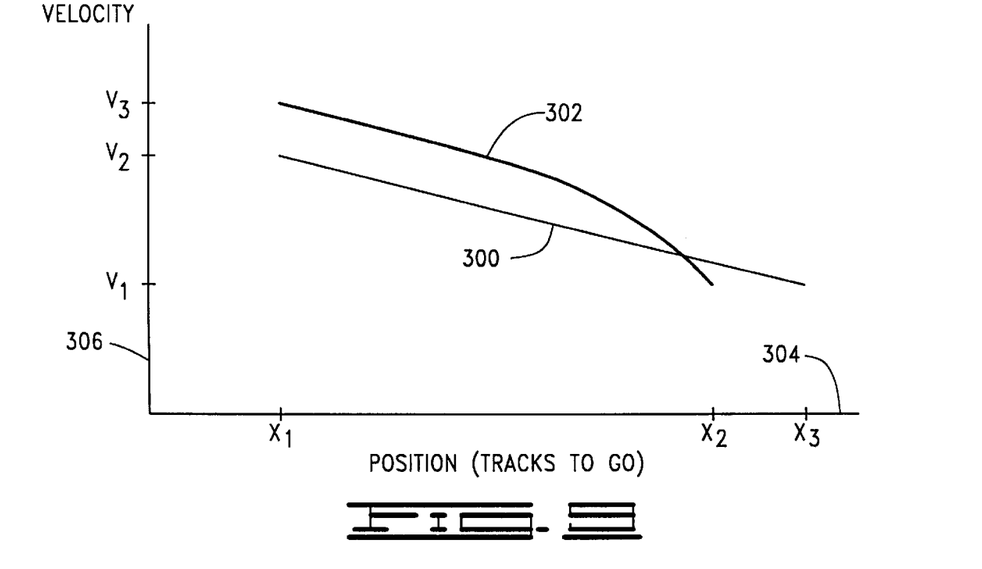
FIG. 9 is a graphical comparison of head deceleration through shorting of the actuator coil and through active deceleration using the servo circuit of FIG. 2.

As discussed above with reference to FIG. 6, not only can the maximum demand velocity be selected based on proximity of a destination track to a limit stop, but the deceleration portion of the velocity profile can also be modified based on such proximity. It has been found that the servo control circuit of FIG. 7 can actively decelerate the head 120 at a rate faster than can be achieved by shorting the coil 113. For example, FIG. 9 provides a graphical representation of a shorted deceleration curve 300 and a corresponding active deceleration curve 302, plotted against an x-axis 304 indicative of position (tracks to go) and a y-axis 306 indicative of head velocity.

Figure 10:
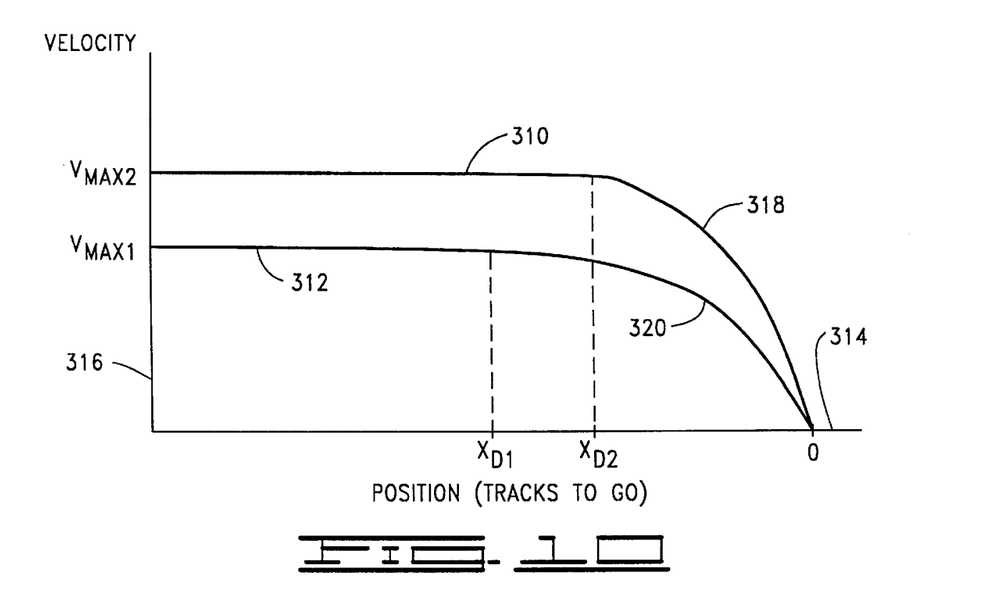
FIG. 10 provides graphical representations of velocity profiles in accordance with preferred embodiments.

It will be noted that the distance required to reduce the velocity of the head 120 by 50% (i.e., from velocity $V_2$ to $V_1$) through shorting of the coil, measured as the distance from track $X_1$ to track $X_3$, is about 25% longer than the distance required to reduce the velocity from a higher velocity $V_3$ to $V_1$ (which occurs in the distance from $X_1$ to $X_2$). If $V_1$ represents a velocity at which contact with the associated limit stop can safely occur without damage to the disc drive 100, then in another embodiment, seeks to destination tracks that are farther from a limit stop than the distance $X_1$ to $X_3$ can be carried out using a higher maximum demand velocity $V_{MAX2}$ with a conventional deceleration portion, and seeks to tracks that are within the distance $X_1$ to $X_3$ from a limit stop can be carried out using a lower maximum demand velocity $V_{MAX1}$ and a degraded deceleration portion. FIG. 10 illustrates this embodiment.

More particularly, FIG. 10 shows a normal velocity profile curve 310 and reduced velocity profile curve 312, plotted against position x-axis 314 and velocity y-axis 316. The normal velocity profile curve 310 has maximum demand velocity $V_{MAX2}$ and converts to deceleration portion 318 at $X_{D2}$; the reduced velocity profile curve 312 uses maximum demand velocity $V_{MAX1}$ and converts to deceleration portion 320 at $X_{D1}$. An advantage of the embodiment set forth by FIG. 10 is that the normal velocity profile 310 is utilized for a majority of the disc surface and the reduced velocity profile curve 312 is utilized only for tracks adjacent the limit stops. For example, in one embodiment the innermost and outermost regions R1 and R3 are only about 0.64 cm (0.25 inches) in radial width and the central region R2 extends across the remainder of the disc 106.

Additional preferred embodiments maintain the maximum velocity $V_{MAX}$ at a selected, high value for all destination tracks, but select a deceleration profile in relation to the location of the destination track. Such embodiments are discussed with reference to FIGS. 11 and 12.

Figure 11:
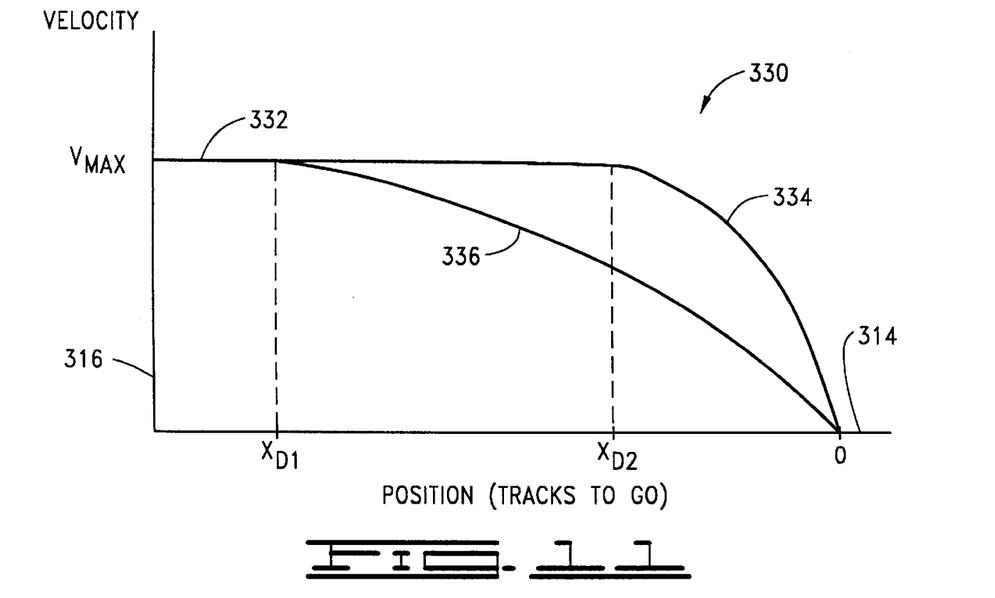
FIG. 11 provides graphical representations of velocity profiles in accordance with additional preferred embodiments.

FIG. 11 provides a two-dimensional representation of a family of velocity profile curves, generally denoted at reference numeral 330 and plotted against x and y axes 314, 316 (similar to the axes used in FIG. 10).

The curves 330 share a common maximum velocity portion 332 with a common maximum velocity $V_{MAX}$, as shown. However, the curves 330 have a range of different deceleration portions, bounded by a maximum (highest rate) deceleration portion 334 which begins at a distance XD2 from the destination track 0, and a minimum (lowest rate) deceleration portion 336, which begins at a distance XD1 from the destination track 0. Thus, for tracks at mid-portions of the discs 106, the head 120 will follow a deceleration profile as defined by the portion 334. For tracks adjacent the limit stops, the heads 120 will follow the portion 336. For tracks between these two locations, the heads 120 will follow a deceleration profile that falls within the range between 334 and 336.

Figure 12:
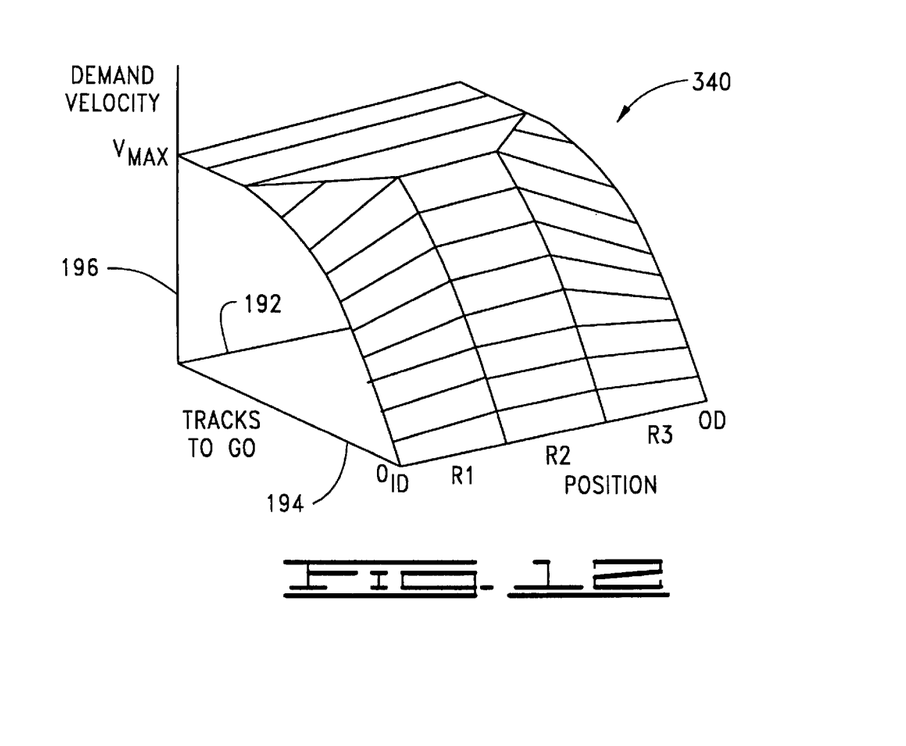
FIG. 12 is a three-dimensional graphical representation of a family of velocity profiles for the tracks on the discs in accordance with additional preferred embodiments.

FIG. 12 provides a three-dimensional surface 340 representative of a family of velocity profile curves such as 330 in FIG. 11. The surface 340 is plotted against x, y and z axes 192, 194 and 196 (as used in FIG. 6). As before, the regions R1, R2 and R3 divide the radius of the associated disc 106 into thirds, but such is merely illustrative of a preferred embodiment and is not limiting. Seeks are generally carried out as previously discussed in FIG. 8, except that the appropriate deceleration profile is selected in step 280 and used to decelerate the head in step 282.

It will now be clear that the present invention, as embodied herein and claimed below, presents several important advantages over the prior art. The ability of the disc drive 100 to adaptively select the rate of deceleration and the maximum velocity of the head 120 during a seek ensures that the actuator will contact the limit stops at a velocity below a safe threshold level, reducing the risk of damage to the disc drive. Depending on the requirements of a given application, seek access time can be maintained, or even improved. Moreover, although it is common in the prior art to narrow the recording band to increase the distance (deceleration zone) between the innermost and outermost tracks and the corresponding limit stops, the present invention accommodates a wider recording band, allowing tracks to be placed closer to the edges of the disc recording surface and increasing the total data storage capacity of the drive.

In summary, the present invention is directed to an apparatus and method for improving the operational performance of a disc drive using an adaptive velocity profile selected in relation to destination track location.

In accordance with preferred embodiments, a disc drive 100 includes a rotatable disc 106 with a recording surface on which a plurality of tracks are defined and an actuator 110 which supports a head 120 adjacent the tracks. The head is moved through application of current to a coil 113 of an actuator motor 114.

A servo circuit 130 performs a seek operation to move the head from an initial track to a destination track by accelerating and maintaining the head at a maximum velocity and then decelerating the head to the destination track in accordance with a velocity profile 150, 310, 312. The servo circuit adaptively selects the velocity profile 150, 190, 330, 340 in relation to the physical location of the destination track on the disc to minimize damage to the disc drive should control of the actuator be lost and the actuator come into contact with a limit stop 122 designed to limit the radial excursion of the head. Such adaptation can include selection of an appropriate deceleration portion 166, 318, 320, 334, 336 and selection of an appropriate maximum velocity 180, 310, 312.

For purposes of the appended claims, consistent with the foregoing discussion the phrases "deceleration portion" and "deceleration trajectory" will be defined as the desired trajectory of the head as the head is decelerated from a maximum velocity to reach a position adjacent the destination track. Description of a seek wherein a head accelerates to a maximum velocity and then decelerates along a deceleration profile will be understood to describe operation such as illustrated by the long seek of FIG. 3 which begins at track $X_1$ and makes full use of the entire deceleration profile, but will not be read to encompass a short seek where the head does not reach the maximum velocity and coasts, such as the other seek of FIG. 3 which begins at track $X_2$ and only uses a portion of the deceleration profile. The term "circuit" will be understood to be realizable in hardware or firmware/programming. Method steps have been individually labeled for convenience, but are not necessarily limited to the order shown.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for carrying out a seek in a disc drive by moving a head from an initial track to a destination track on a corresponding disc in accordance with a velocity profile having a maximum velocity and a deceleration portion, the method comprising steps of:
   (a) identifying a physical location of the destination track and a length of the seek in relation to the number of tracks between the initial track and the destination track;
   (b) selecting a deceleration portion in relation to the physical location of the destination track, wherein for a given seek length, the deceleration portion associated with a destination track proximate a selected one of an innermost or outermost diameter of the disc provides a decreased rate of change of velocity as compared to a rate of change of velocity of a deceleration portion associated with a destination track proximate an intermediate portion of the disc;
   (c) applying current to an actuator coil to accelerate the head to a maximum velocity; and
   (d) subsequently applying current to the actuator coil to decelerate the head from the maximum velocity in relation to the selected deceleration portion.

2. The method of claim 1, further comprising a step of:
   (e) selecting the maximum velocity of the head during the seek in relation to the physical location of the destination track, wherein for a given seek length, the maximum velocity associated with a destination track proximate a selected one of the innermost or outermost diameter of the disc has a reduced magnitude as compared to a magnitude of a maximum velocity associated with a destination track proximate the intermediate portion of the disc.

3. The method of claim 2, wherein the reduced magnitude of the maximum velocity associated with a destination track proximate a selected one of the innermost or outermost diameter of the disc is selected to reduce damage to the disc drive as a result of contact between an actuator supporting the head and a limit stop used to limit radial excursion of the head.

4. In a method for performing a seek operation in a disc drive comprising steps of:
   (a) determining a velocity profile having a maximum velocity to which a head is accelerated from an initial track and a deceleration portion along which the head is decelerated to come to rest adjacent a destination track, the velocity profile indicative of a desired trajectory of the head and determined in relation to a distance between the initial and destination tracks;
   (b) applying current to an actuator motor to accelerate the head to the maximum velocity; and
   (c) subsequently applying current to the actuator motor to decelerate the head to the destination track in relation to the deceleration portion;

an improvement characterized as the method further comprising a step of:
   (d) selecting the maximum velocity in relation to a physical location of the destination track on the disc so that, for a given seek length, the maximum velocity has a reduced magnitude for a track adjacent an innermost or outermost diameter of the disc as compared to a magnitude of the maximum velocity for remaining tracks on the disc.

5. The improvement of claim 4, further comprising a step of:
   (e) selecting the deceleration portion in relation to the physical location of the destination track on the disc so that, for a given seek length, the head is decelerated at a reduced rate of change of velocity for a track adjacent the innermost or outermost diameter of the disc as compared to the deceleration of the head for remaining tracks on the disc.

6. The improvement of claim 4, further comprising steps of:
   (e) arranging tracks on the disc into a plurality of regions; and
   (f) associating a maximum velocity with each of the tracks wherein at least selected tracks in different regions have different maximum velocities.

7. The improvement of claim 4, wherein the arranging step (e) comprises steps of:
   (e1) dividing the tracks into first, second and third regions, respectively, with the first region proximate the innermost diameter of the disc, the third region proximate the outermost diameter of the disc, and the second region disposed between the first and third regions;
   (e2) assigning a greater value of maximum velocity to tracks in the second region;
   (e3) assigning a reduced value of maximum velocity to tracks in the first and third regions.

8. The improvement of claim 6, wherein the reduced value of maximum velocity is assigned to an innermost and an outermost track, respectively, and wherein the maximum velocities of remaining tracks of the first and third regions vary from the reduced value to the greater value.

9. A disc drive, comprising:
   a rotatable disc with a recording surface on which a plurality of tracks are defined;
   an actuator which supports a head adjacent the tracks;
   an actuator motor, coupled to the actuator, which moves the heads across the recording surface, the actuator motor comprising a coil; and
   a servo circuit, operably coupled to the head and the coil, which applies current to the coil to perform a seek operation wherein the head is moved from an initial track to a destination track by accelerating the head to a maximum velocity and decelerating the head to the destination track, wherein the servo circuit decelerates the head at a reduced rate of change in velocity for tracks adjacent innermost and outermost diameters of the disc as compared to tracks at an intermediate portion of the disc.

10. The disc drive of claim 9, wherein the servo circuit further selects the maximum velocity in relation to the physical location of the destination track on the disc.

11. The disc drive of claim 10, further comprising a limit stop which limits extension of the heads across the recording surface by contact with a corresponding feature of the actuator, wherein the maximum velocity is selected to reduce damage to the disc drive as a result of contact between the limit stop and the actuator.

12. The disc drive of claim 10, wherein the tracks are divided into first, second and third regions, respectively, with the first region proximate the innermost diameter of the disc, the third region proximate the outermost diameter of the disc, and the second region disposed between the first and third regions, wherein a greater value of maximum velocity is selected for tracks in the second region, and wherein a reduced value of maximum velocity is selected for tracks in the first and third regions.

13. The disc drive of claim 12, wherein the reduced value of maximum velocity is selected for innermost tracks in the first region and for outermost tracks in the third region, respectively, and wherein the values of maximum velocity for remaining tracks in the first and third regions are selected by interpolating between the greater and reduced values.

* * * * *